United States Patent Office 2,727,835
Patented Dec. 20, 1955

2,727,835

PROCESS OF SIZING SYNTHETIC YARN WITH HYDROLYZED POLYALKYL ACRYLATES

Gerald R. Barrett, Winchester, Mass., assignor to Monsanto Chemical Company, St. Louis, Mo., a corporation of Delaware No Drawing. Application July 31, 1952, Serial No. 301,965

3 Claims. (Cl. 117—138.8)

The present invention relates to novel polymeric derivatives, particularly novel derivatives of polyalkyl acrylates, and to processes of producing such derivatives, and to processes of sizing synthetic fiber-forming linear polyamides.

It is one object of this invention to provide novel polymers, particularly novel polymers which are derived from polyalkyl acrylates or polyacrylonitrile.

It is a further object of this invention to provide novel polymers which are soluble in aqueous solutions under acidic and alkaline conditions.

It is a further object of this invention to provide a process for preparing novel polymeric derivatives from polyalkyl acrylates and polyacrylonitrile, particularly polymeric derivatives which are soluble in aqueous solutions under acidic and alkaline conditions.

It is a further object of this invention to provide a process for sizing warp yarns with acidic aqueous solutions of a novel polymeric material derived from a polyalkyl acrylate, particularly polymethyl acrylate.

Still further objects and advantages of this invention will become apparent from the following description and the appended claims.

The novel polymers of this invention comprise essentially a polymer of an alkyl acrylate in which from 40 to 80% of the ester groups in the polymer have been hydrolyzed to carboxyl groups, or a polyacrylonitrile in which from 40 to 80% of the nitrile groups have been hydrolyzed to carboxyl groups. The polymers may contain small amounts of chemically combined modifying agents such as styrene, vinyl acetate, alkyl methacrylates, acrylic acid or methacrylic acid as will be pointed out in greater detail hereinafter.

The novel polymers of this invention are prepared in general by first hydrolyzing a substantially stable aqueous dispersion or emulsion of a polyalkyl acrylate or a polyacrylonitrile with an alkaline hydrolyzing agent, preferably an alkali metal hydroxide, while maintaining the polymer in a dispersed or emulsified state, until from about 40 to 80% of the ester groups or nitrile groups of the polymer have been hydrolyzed to

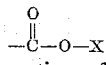

groups, where X is the cation of the hydrolyzing agent, and then precipitating the hydrolyzed polymer from the aqueous medium by means of an acid, preferably in the form of a plastic, coherent mass, whereby the

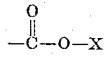

groups in the hydrolyzed polymer are converted to carboxyl groups. The precipitated polymer is preferably extracted to remove a substantial portion of electrolytes and acid anions therefrom and thereafter it is dried or is dissolved in an aqueous medium.

The aqueous dispersion or emulsion of the polymer used in the process of this invention may be prepared in various ways. One suitable procedure comprises heating, preferably at the reflux temperature, an aqueous emulsion of a monomeric alkyl acrylate, preferably methyl acrylate or monomeric acrylonitrile in the presence of a polymerization catalyst and an amount of an emulsifying agent sufficient to provide a stable dispersion or emulsion during and after polymerization. This procedure is conventional and is well known in the art. The emulsion polymerization procedure may be modified to provide low molecular weight polymers by the use of relatively large amounts of organic peroxide or by the use of retarders such as beta nitro styrene or the retarders disclosed generally in United States Patent No. 2,537,015. Chain transfer agents may also be used.

The polymers produced by the foregoing procedure may be modified to some extent by incorporating a liquid, water-insoluble vinyl monomer, which is copolymerizable with the monomers described above and contains a single $CH_2=C<$ group, in amounts up to 10% by weight of the total monomers. As examples of such vinyl monomers may be mentioned styrene or ring substituted styrene, vinyl acetate, alkyl methacrylates such as methyl methacrylates and the like. When the acrylate monomers are used as the primary monomers, it is possible to modify the resulting polymer by the use of acrylonitrile monomers, and when acrylonitrile is used as the primary monomer, it is possible to modify the acrylonitrile with the acrylate monomers. However, when modifying vinyl monomers are used as described above and the rate of reaction between the modifying monomer and the primary monomer is not the same as the homopolymerization rate of the primary monomer, it is usually necessary to add the modifying monomer and the primary monomer to an aqueous solution of a polymerization catalyst and emulsifying agent, while heating, at substantially the same rate as the reaction rate of such modifying monomer and the primary monomer in order to obtain a final polymer (which is really a copolymer) of uniform composition. The use of modifying monomers as described above introduces various complications in the polymerization procedure and also alters, somewhat, the properties of the polymers of this invention. For these reasons, it is preferred not to employ such modifying monomers.

By using up to 3%, preferably 1 to 2%, by weight of the total monomers of acrylic acid, methacrylic acid or, in some cases, alkyl acid esters of maleic acid, it is possible to produce aqueous polymeric dispersions or emulsions which have unusual stability during the subsequent hydrolysis step, even without the addition of added emulsifying agents, and accordingly the use of such modifying monomers is preferred in the preparation of the starting dispersions or emulsions employed in the processes of this invention.

In carrying out the emulsion polymerization procedure described above, it is possible to use a wide variety of emulsifying or dispersing agents, including anionic surface active agents which are soluble under acid conditions, for example, alkali metal salts or alkyl benzene sulfonic acids, in which the alkyl group contains 10 or more carbon atoms, sulfonated alcohols containing 10 or more carbon atoms and alkali metal salts of sulfo dialkyl succinic acid, and non-ionic surface active agents such as polyoxyethylene esters of tall oil or alkylated phenols, in which the alkyl group contains at least 8 carbon atoms. Other emulsifying agents conventionally used in acidic emulsion polymerization processes will be apparent to those skilled in the art. A wide variety of emulsion polymerization catalysts may be used including potassium persulfate and the organic peroxides such as benzoyl peroxide and the like.

The aqueous dispersions of polyalkyl acrylates or polyacrylonitrile employed in the processes of this invention may be prepared by conventional procedures other than emulsion polymerization techniques.

In preparing the novel polymers of this invention, the aqueous dispersion or emulsion of a polyalkyl acrylate or a polyacrylonitrile is first treated with an aqueous solution of an alkaline hydrolyzing agent such as sodium hydroxide to effect a partial hydrolysis or saponification of the ester or nitrile groups of the polymer to form

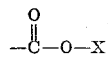

groups, where X is the cation of the hydrolyzing agent. This partial hydrolysis is carried out under conditions such that substantially no coagulated polymer is formed in the dispersion since hydrolysis proceeds most rapidly and uniformly in a smooth dispersion or emulsion which is substantially free of coagulated polymer. This is preferably accomplished by using relatively dilute aqueous solutions of the alkaline hydrolyzing agent, for example, solutions containing less than 5% of the hydrolyzing agent. The amount of hydrolyzing agent used in this stage of the hydrolysis is preferably such as to hydrolyze about 4 to 10% of the ester or nitrile groups of the polymer. Another factor of some importance in this partial hydrolysis step is the concentration of polymer in the hydrolyzing mixture which is maintained sufficiently low to avoid the coagulation of the polymer. In general, coagulation of the copolymer is avoided under the above conditions when the hydrolysis mixture contains less than 15% by weight of polymer. During the initial stages of the partial hydrolysis it is usually necessary to add an emulsifying agent of the type used in the preparation of the original polymer dispersion or emulsion along with the hydrolyzing agent in order to maintain the stability of the dispersion or emulsion. Such emulsifying agent is preferably incorporated in the aqueous solution of the hydrolyzing agent and is added in amounts sufficient to maintain the dispersion in a stable condition, say in concentrations of about 0.5 to 3% by weight based on the solution of the hydrolyzing agent. However, an emulsifying agent need not be used in those instances where the polymer has been modified, during its preparation, with from 1 to 3% by weight of acrylic acid or methacrylic acid since such modified polymers have exceptional stability in dispersion during partial hydrolysis.

The partial hydrolysis proceeds very slowly at room temperatures, and it is generally necessary to use elevated temperatures to obtain a practical rate of hydrolysis or saponification of the ester or nitrile groups in the polymer. Generally, temperatures ranging from about 70° C. up to the boiling temperature of the hydrolysis mixture at atmospheric pressure are satisfactory for this purpose.

After the initial hydrolysis or saponification has taken place, which usually requires from about 5 to 20 minutes or longer depending on the temperature and other factors, further quantities of alkaline hydrolyzing agent are added in one or more additions, preferably in at least two additions, to complete the hydrolysis or saponification to the extent desired, namely, 40 to 80% of the ester or nitrile groups of the starting polymer. The hydrolyzing agent is preferably added in the form of an aqueous solution, but this is not essential and depends on the amount of agent added at any one time. However, the total amount of alkaline hydrolyzing agent added preferably should not exceed the amount required to effect the desired degree of hydrolysis or saponification. During this stage of hydrolysis the use of an emulsifying agent is usually not necessary, although an emulsifying agent may be used if desired. The temperature during this stage of hydrolysis should be relatively high. Satisfactory operating temperatures are between about 70° C. and the boiling point of the dispersion at atmospheric pressure. The duration of heating is generally between about 10 to 60 minutes depending on the temperature used and the degree of hydrolysis or saponification which it is desired to obtain.

It is not essential to carry out the hydrolysis or saponification of the polymer by the stepwise addition of an aqueous solution of the alkaline hydrolyzing agent, since it is possible to add the solution of such agent to the polymer dispersion continuously as long as dilute aqueous solutions of such agent are used in the initial stages of hydrolysis, that is, until about 4 to 10% of the ester or nitrile groups of the polymer are hydrolyzed, and as long as the polymer concentration is maintained sufficiently low to avoid the formation of coagulated polymer.

Although various alkaline hydrolyzing agents such as ammonia, sodium carbonate, sodium hydroxide and the like may be used in carrying out the hydrolysis or saponification of the polymers, the alkaline hydrolyzing agents other than the alkali metal hydroxides have one or more disadvantage, and, accordingly, it is definitely preferred to use an alkali metal hydroxide as, for example, sodium hydroxide for this purpose.

During the hydrolysis or saponification, as described above, it is preferred to agitate the polymer dispersion as by stirring or the like in order to avoid zones of high alkali content wherein the polymer is hydrolyzed too much or zones of low alkali content in which no appreciable hydrolysis or saponification takes place.

As a result of the hydrolysis or saponification procedure, hereinbefore described, a smooth, viscous solution of a polalkyl acrylate or a polyacrylonitrile in which from 40 to 80% of the ester or nitrile groups have been converted to

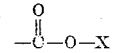

groups, wherein X is the cation of the alkaline hydrolyzing agent, is obtained. One reason why the saponification or hydrolysis is carried out to the extent of not more than 80% is that the partially hydrolyzed polymer cannot be processed satisfactorily, as will appear more fully hereinafter. On the other hand, if the polymer is hydrolyzed less than 40%, its utility is adversely affected.

After the hydrolysis or saponification of the polymer is carried out, the smooth viscous solution or dispersion there of is first cooled. The reason for cooling will become apparent in the following description. After cooling, the smooth viscous solution is acidified with a strong mineral or organic acid which is capable of lowering the pH of the solution down to about 1.5 or lower. During the acidification the solution is preferably stirred or agitated, and the amount of acid used preferably should be sufficient to precipitate substantially all of the partially hydrolyzed polymer from solution, and preferably an amount which will lower the pH of the aqueous liquid to 1.5 or lower. In order to obtain a precipitated polymer which may be purified readily, it is usually necessary to obtain the precipitated copolymer in the form of a coherent, plastic mass. This is accomplished by cooling the smooth, viscous solution of the polymer, prior to acidification, to a temperature at which a coherent, plastic mass of polymer is obtained when the solution is acidified. This temperature will vary depending on the particular polymer in solution and other factors. In general, if the solution of polymer is cooled below 60° C., prior to acidification, a coherent, plastic mass of polymer is obtained on acidification providing the polymer solution is not cooled appreciably below 20° C., but superior results are obtained in most cases by cooling the smooth, viscous solution of the polymer to between 25 and 50° C. prior to acidification of the solution. If the temperature of the solution is too high prior to acidification, the acidified polymer tends to separate as a highly viscous liquid which emulsifies as fine particles and subsequent cooling does not aid materially since there is a tendency then to form lumps which do not coalesce readily and are hard to purify. If the temperature of the polymer solution is too low prior to acidification the acidified polymer tends to separate from the aqueous phase as particles or lumps which are quite difficult to purify. In general the lower temperatures, for example, between 20 and 35° C., are most suitable when a partially hydrolyzed polyacrylonitrile polymer is being acidified and also in those instances where the polymer which is being acidified has been hydrolyzed to the extent of about 70 or 80%.

A wide variety of strong mineral or organic acids may be used to acidify the partially hydrolyzed polymers, including mineral acids such as sulfuric acid, hydrochloric acid and phosphoric acid, and strong organic acids such as glycolic, formic, lactic and oxalic acids. The mineral acids, and particularly sulfuric acid, are preferred, but the organic acids have advantages in that, in general, the use of organic acids enables the preparation of acidified polymers, from which films may be prepared without appreciable incompatibility of the electrolyte contained therein.

As a result of the acidification of the partially hydrolyzed polymer, the

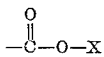

groups thereof are converted to carboxyl groups and the resulting polymer contains from 40 to 80% of carboxyl groups and 60 to 20% of ester or nitrile groups, based on the total carboxyl, ester and nitrile groups in the starting polymer. In a few instances the acidified polymers may be used as such, after separation from the aqueous phase, but since the precipitated polymers contain substantial amounts of electrolytes and free acid, which interfere to some extent with the utility of the polymers, it is definitely preferred to wash the polymers to remove a major portion or substantially all of electrolytes or free acids therefrom. This washing of the acidified polymer is suitably carried out by stirring, kneading or working the polymer as a coherent, plastic mass in the presence of water which may or may not contain small amounts of an acid. In carrying out the washing of the polymer, it is preferred to maintain the wash water at a pH below 2.5 by stopping the washing operation before the pH rises above 2.5 or by using wash water containing an amount of acid sufficient to depress the pH of the wash water below 2.5, preferably an organic acid which is compatible with the polymers being prepared, such as the organic acids described above. If the pH of the wash water is allowed to rise appreciably above 2.5, some loss of polymer yield is experienced because of the increasing solubility of the polymer at higher pH values. However, it is possible to depress the solubility of the polymer at a pH slightly above 2.5 by the use of cold wash water, that is, wash water having a temperature below 20° C. and above its freezing point.

The washed polymers may be dried at normal room temperature, vacuum dried or drum dried to form a solid, substantially anhydrous product. Such product may be shipped or stored for practical periods of time, and then dissolved in water with the aid of an alkali, if necessary, or in an organic solvent. The washed polymer may also be dissolved directly in water with the aid of small amounts of an alkali such as sodium hydroxide, ammonia or strong amines, without drying the polymer.

As is pointed out previously herein the novel polymers of this invention comprise a polyalkyl acrylate in which from 40 to 80% of the ester groups have been hydrolzed to carboxyl groups or a polyacrylonitrile in which from 40 to 80% of the nitrile groups have been hydrolyzed to carboxyl groups. If more than 80% of the ester or nitrile groups in the original polymer are hydrolyzed the polymer is too soluble even at low pH values and therefore cannot be washed substantially free of electrolytes and acid, after acidification, without a substantial decrease in polymer yield. On the other hand, if less than 40% of the ester or nitrile groups in the original polymer are hydrolyzed, the polymer does not dissolve in water at low pH values and this seriously limits the utility of the polymer in certain types of application, especially in the case of polymers derived from polyalkyl acrylates wherein the utility of the polymer is adversely affected as a sizing agent for water-insoluble fiber-forming synthetic linear polyamides such as polyhexamethylene-adipamide. Although the per cent hydrolysis range given above is generally applicable for polymers derived from medium molecular weight polyalkyl acrylates or polyacrylonitriles, deviations of about 5% from the lower range of 40% or the upper range of 80% is possible when the hydrolyzed polymers are prepared from low or high molecular weight starting materials, respectively. Preferred polymers are those which comprises from about 55 to 70% of carboxyl groups and from about 45 to 30% of ester or nitrile groups based on the total carboxyl, ester and nitrile groups in the polymer.

A further understanding of the processes and polymers described herein will be obtained from the following specific examples which are intended to illustrate this invention, but not to limit the scope thereof, parts and percentages being by weight unless otherwise specified.

*Example I*

A mixture of 4 parts of acrylic acid, 18 parts of methyl acrylate, 160 parts of acrylonitrile and 0.36 part of benzoyl peroxide was added gradually over a period of 20 minutes, with stirring, to a solution of 3.6 parts of sodium petroleum sulfonate (Acto 450) and 1.8 parts of potassium persulfate in 1000 parts of water, which solution was maintained at reflux temperature (which was initially about 70° C.) under a reflux condenser. Heating of the resulting emulsion was continued under reflux conditions until the temperature of the emulsion rose to 90° C. and then a minor amount of residual monomers was distilled from the resulting polymer dispersion, which contained about 15% polymer solids. The polymer in the dispersion consisted of about 88% of combined acrylonitrile, about 10% of combined methyl acrylate and 2% of combined acrylic acid.

Five hundred parts of the polymer dispersion or emulsion, prepared as described immediately above, was treated with 28% aqueous ammonia, while stirring, until a slightly alkaline mixture was obtained. Six hundred parts of a 10% aqueous sodium hydroxide were then added to the mixture while stirring vigorously, and hydrolysis or saponification of the polymer was effected by heating the resulting mixture for 1 hour at 120° C. At the end of this time, the resulting smooth viscous solution was cooled to room temperature (about 30° C.), and then acidified with 110 parts of a 50% aqueous sulfuric acid solution, while stirring slowly. As a result of the acid addition, a coherent, plastic mass of polymer was formed. This polymer contained about 65% of carboxyl groups, based on the total carboxyl groups, ester groups and nitrile groups in the polymer. The coherent, plastic mass of polymer was washed with water which contained sufficient sulfuric acid to maintain the pH of the wash water at 1.0 to 2.0 while stirring the mass slowly, until the mass was substantially free of sulfates. The mass was drained and was then dissolved in water with the addition of sufficient sodium hydroxide to provide a solution having a pH of 3.5.

The resulting solution may be used as a thickening composition for printing pastes in conjunction with natural gums or as an application medium for acid resistant dyes or pigment. If the polymer mass is dissolved in water with ammonia or an amine, the composition may be used as a pigment binder.

*Example II*

An emulsion containing 25 parts of methyl acrylate, 0.05 part of beta nitro styrene, 0.25 part of potassium persulfate, 1 part of the sodium salt of decyl benzene monosulfonic acid and 350 parts of water was stirred and heated under a reflux condenser until the emulsion attained reflux temperature (about 72° C.). Twenty-five parts of methyl acrylate were then added gradually over a period of 10 minutes, while maintaining the temperature of the emulsion at about 73–75° C. Heating was continued until the reflux temperature rose to about 90–95° C. which corresponds to a substantially complete conversion of methyl acrylate monomers to polymethyl acrylate. The resulting dispersion or emulsion contained about 12.5% of polymethyl acrylate.

A solution of 1.6 parts of sodium hydroxide and 1.2 parts of the sodium salt of decyl benzene monosulfonic acid in 80 parts of water were added with stirring to 400 parts of the polymethyl acrylate dispersion, after which the mixture was heated at a temperature of 80 to 100° C. for 10 minutes. At this time about 5% of the ester groups in the polymer had been hydrolyzed to

groups. Eight parts of a 10% aqueous sodium hydroxide were then added to the dispersion and the heating was continued for 5 minutes. Finally 13 parts of a 50% aqueous sodium hydroxide solution were added and heating was continued for an additional 20 minutes. At this stage about 60% of the ester groups in the original polymethyl acrylate had been saponified to

groups, and a smooth, viscous solution was obtained. This solution was cooled to 40° C. and then acidified with 88 parts of a 50% aqueous sulfuric acid solution, while stirring slowly, thereby converting the sodium carboxylate groups in the polymer to carboxyl groups. A coherent, plastic mass of acidified polymer was thus obtained, and this mass was washed with water at about 25° C., with slow stirring, until it was substantially free of sulfates and sulfuric acid. After the mass was removed from water it was brought into solution by the use of 0.7 part of sodium hydroxide and sufficient water to give a solution containing 25% of dissolved polymer solids, the total weight of solution being between 105 and 110 parts. This solution was diluted to a 5% solution with water, and the diluted solution had a pH of 3.3 and a viscosity of 6 centipoises at 25° C.

*Example III*

An emulsion containing 1.2 parts of acrylic acid, 58.8 parts of methyl acrylate, 0.025 part of n-dodecyl mercaptan, 1 part of the sodium salt of decyl benzene monosulfonic acid, 0.2 part of ammonium persulfate and 400 parts of water was stirred and heated under a reflux condenser until the emulsion attained reflux temperature (about 72° C.). One and two-tenths parts of acrylic acid and 58.8 parts of methyl acrylate were then added gradually over a period of 10 minutes, while maintaining the temperature of the emulsion at about 73–75° C. Heating was continued until the reflux temperature rose to about 90–95° C. which corresponded to a substantially complete conversion of monomers to polymer. The resulting dispersion contained about 30% of dispersed polymer solids which comprised about 98% of combined methyl acrylate and 2% combined acrylic acid. This dispersion was then diluted with water until it contained 12.5% polymer.

Four hundred parts of the above 12.5% dispersion were processed according to the procedure set forth in the second paragraph of Example II with the sole exception that the sodium salt of decyl benzene monosulfonic acid was not employed with the initial sodium hydroxide solution.

The final polymer solutions of Examples II and III possess exceptional utility as sizing compositions for sizing water-insoluble fiber-forming synthetic linear polyamide yarns such as polyhexamethylene-adipamide yarns, and this aspect of the invention will be described in greater detail hereinafter. This utility of polymers derived from polyalkyl acrylates is not shared by the polymers derived from polyacrylonitrile.

In general, the novel polymers of this invention are soluble in water at a pH above 2.5, and aqueous solutions of such polymers may be used as thickening agents in printing pastes, as sizing solutions for cotton or regenerated cellulose or cellulose acetate yarns, as dispersing media for dyes and pigments and as stiffening agents in textile finishing compositions.

Aqueous solutions of the partially hydrolyzed polyalkyl acrylates prepared in accordance with the processes of this invention have exceptional utility in the sizing of water-insoluble linear polyamide yarns. In sizing water-insoluble fiber-forming synthetic linear polyamide yarns with such solutions, the solutions, which are employed at a pH below 4.0, and preferably below 3.5, are applied to the yarns in an amount sufficient to provide from about 2 to 10% by weight of the polymer, based on the weight of the dry yarn, after which the yarn is completely or partially dried and is finally woven or knitted into a fabric.

Sizing is suitably accomplished on a conventional slasher by unwinding the yarns from a creel, passing them in parallel arrangement beneath the surface of the polymer solution, and thence between squeeze rolls where excess size solution is removed, and finally the yarns are passed over drying cans or through a heated oven where they are dried sufficiently to render them substantially non-tacky.

The sizing solution may contain from about 3 to 15% by weight of the partially hydrolyzed polymer, and is preferably maintained at a temperature between 100 and 180° F. during the sizing operation.

As examples of water-insoluble fiber-forming synthetic linear polyamide yarns which may be sized as described above may be mentioned polyhexamethylene-adipamide yarns and polyhexamethylene-sebaciamide yarns, these being preferred. Other water-insoluble fiber-forming synthetic linear polyamide yarns which may be sized are described in United States Patents Nos. 2,071,250, 2,130,523 and 2,130,948.

The following specific example serves to illustrate the sizing of a water-insoluble linear polyamide yarn.

*Example IV*

Polyhexamethylene-adipamide warp yarns of 70 denier containing 34 filaments having a Z twist of 7 turns per inch were passed through a size solution, which consisted of the final 5% solution obtained as described in Example II, at the rate of 10 yards per minute. The size solution, which had a pH of 3.3, was maintained at a temperature of 140 to 150° F. during the sizing operation. The yarns, after they emerged from the size solution, were passed between squeeze rolls adjusted to give a pressure of 10 pounds per linear inch and then passed over five rotating drying cans heated to temperatures of 180° F., 200° F., 200° F., 200° F. and 160° F., respectively.

The dry yarns were flexible, but yet sufficiently stiff to handle well in a loom. The size coating was extremely flexible, yet tough and highly adherent and did not dust off the yarns or crack when the yarns were quickly stretched and immediately relaxed. The yarns had excellent weaving efficiency when woven in a conventional loom at a relative humidity of 65%, and the polymer size was readily removed from the woven fabric by washing the fabric in warm water.

Any of the polymers described herein which are prepared from polyalkyl acrylates and which contain from 40 to 80% carboxyl groups based on the carboxyl and ester groups in the polymer are suitable for sizing the synthetic linear polyamide yarns, but the preferred products for this purpose are the polymers prepared from polymethyl acrylate.

Various changes and modifications may be made in the polymers and processes described herein as will be apparent to those skilled in the art to which this invention appertains without departing from the spirit and intent of this invention. Accordingly, it is intended that this invention is not to be limited except by the scope of the appended claims.

What is claimed is:

1. A process of sizing water-insoluble polyhexamethylene adipamide yarn which comprises applying to said yarn an acid aqueous solution, having a pH below 4.0, of a partially hydrolyzed polyalkyl acrylate which polyalkyl acrylate contains from 40 to 80% carboxyl groups based on the total carboxyl and alkyl groups in said acrylate, said solution being supplied in an amount sufficient to deposit on the yarn from 2 to 10% by weight of said acrylate based on the weight of the yarn, and drying said yarn.

2. A process as in claim 1 wherein the polyalkyl acrylate is polymethyl acrylate.

3. A process as in claim 1 wherein the solution has a pH of 3.3.

References Cited in the file of this patent

UNITED STATES PATENTS

| | | |
|---|---|---|
| 1,984,417 | Mark et al. | Dec. 18, 1934 |
| 2,140,048 | Fikentscher et al. | Dec. 13, 1938 |
| 2,200,709 | Trommsdorf | May 14, 1940 |
| 2,205,882 | Graves | June 25, 1940 |
| 2,253,146 | Spanagel | Aug. 19, 1941 |
| 2,263,385 | Grimm | Nov. 18, 1941 |
| 2,504,049 | Richards | Apr. 11, 1950 |
| 2,581,832 | Blume | Jan. 8, 1952 |
| 2,597,437 | Bodamer | May 20, 1952 |
| 2,607,711 | Hendricks | Aug. 19, 1952 |
| 2,649,439 | Brown | Aug. 18, 1953 |

FOREIGN PATENTS

| | | |
|---|---|---|
| 437,446 | Great Britain | Oct. 28, 1935 |

OTHER REFERENCES

Krezil: Kurzes Handbuch der Polymerisationstechnik, Bd., II, page 257 (1945), pub. by Edwards, Ann Arbor, Michigan.